Sept. 3, 1957 T. L. FRATES 2,804,809
SEMI-AUTOMATIC RIFLE
Filed June 13, 1952 7 Sheets-Sheet 1
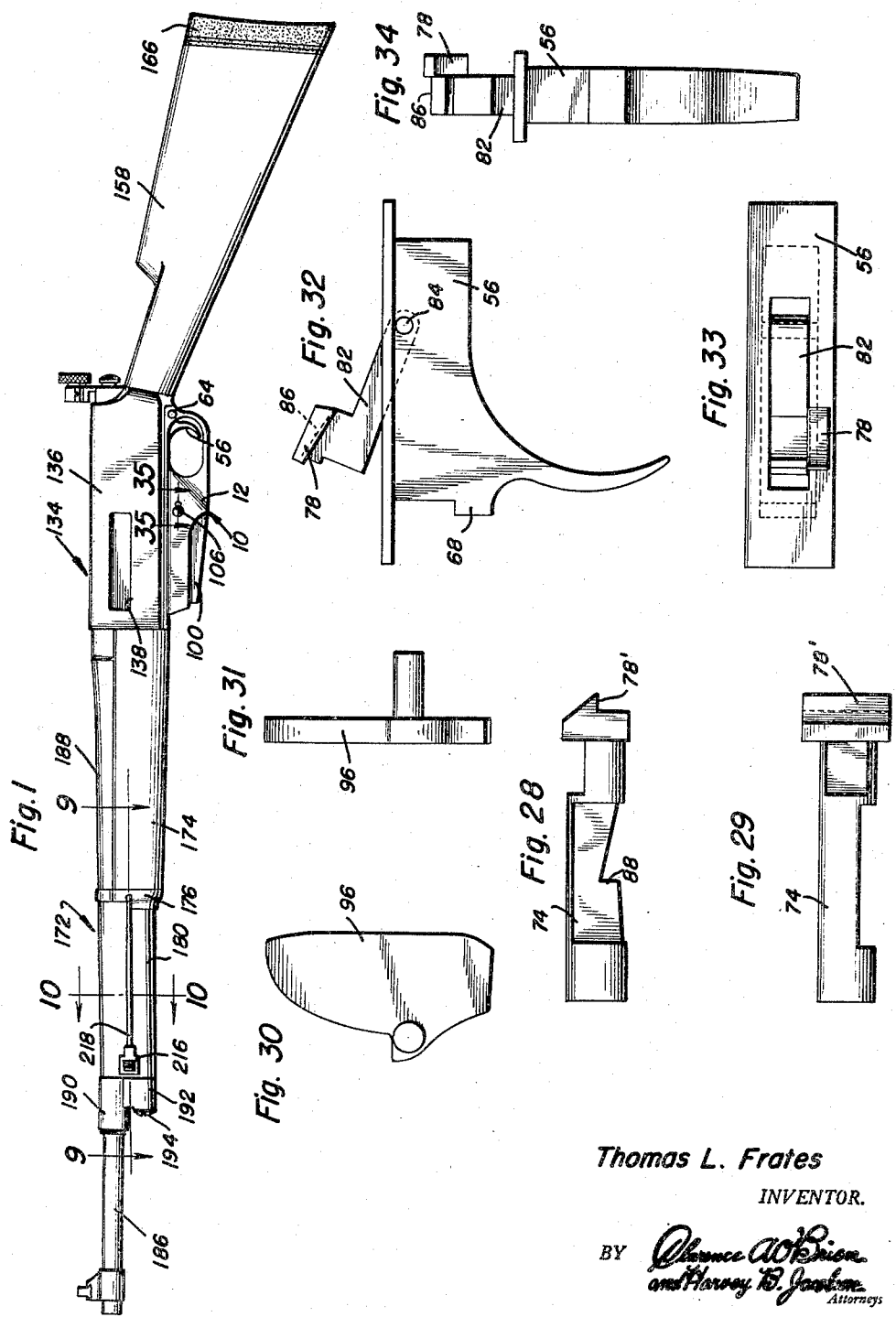
Thomas L. Frates
INVENTOR.
BY *Clarence A. O'Brien*
*and Harvey B. Jacobson*
Attorneys Sept. 3, 1957
T. L. FRATES
2,804,809
SEMI-AUTOMATIC RIFLE
Filed June 13, 1952
7 Sheets-Sheet 2
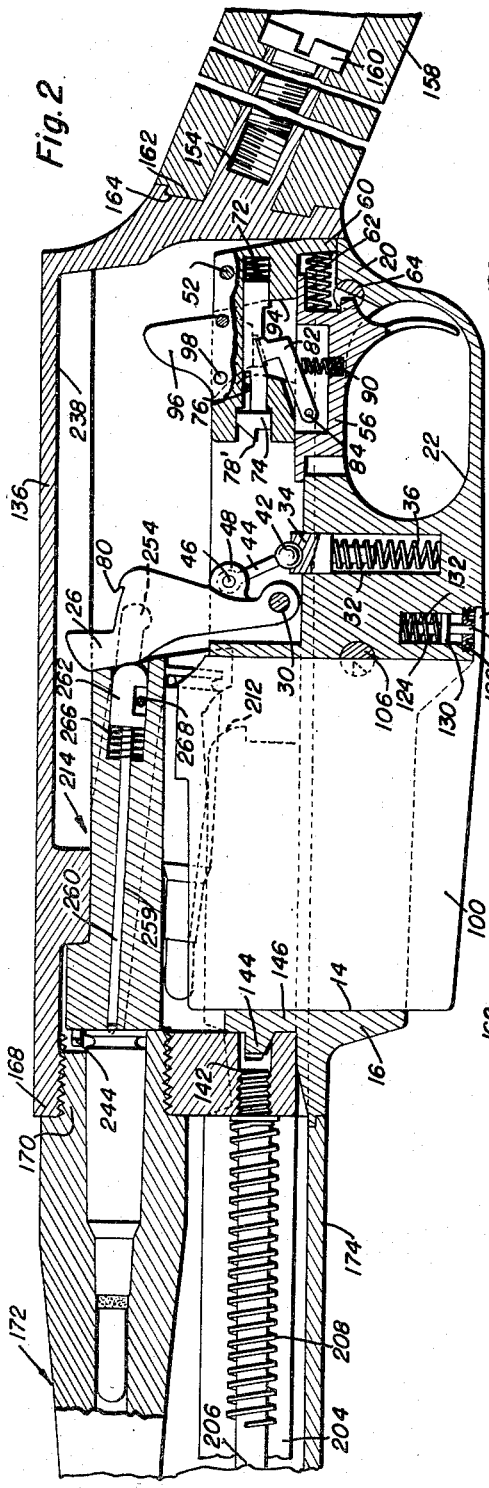
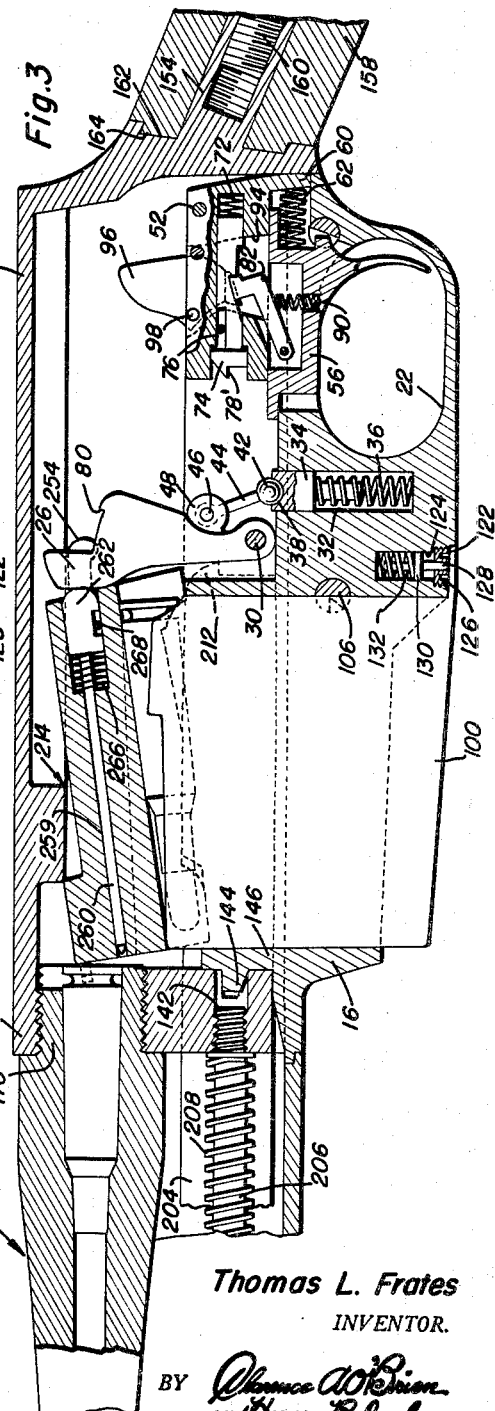
Thomas L. Frates
INVENTOR.
BY Clarence A. O'Brien
and Harvey B. Jacobson
Attorneys

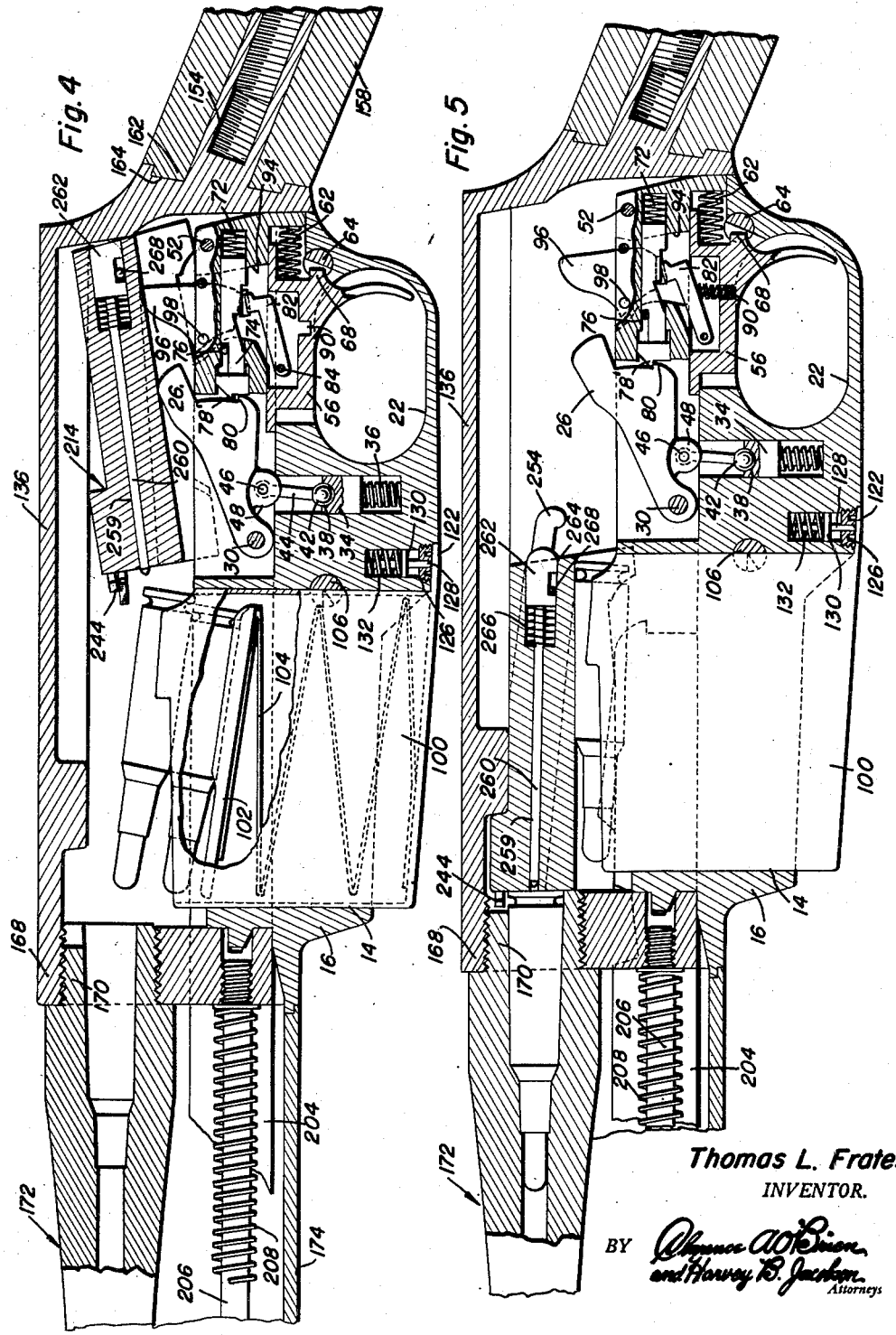

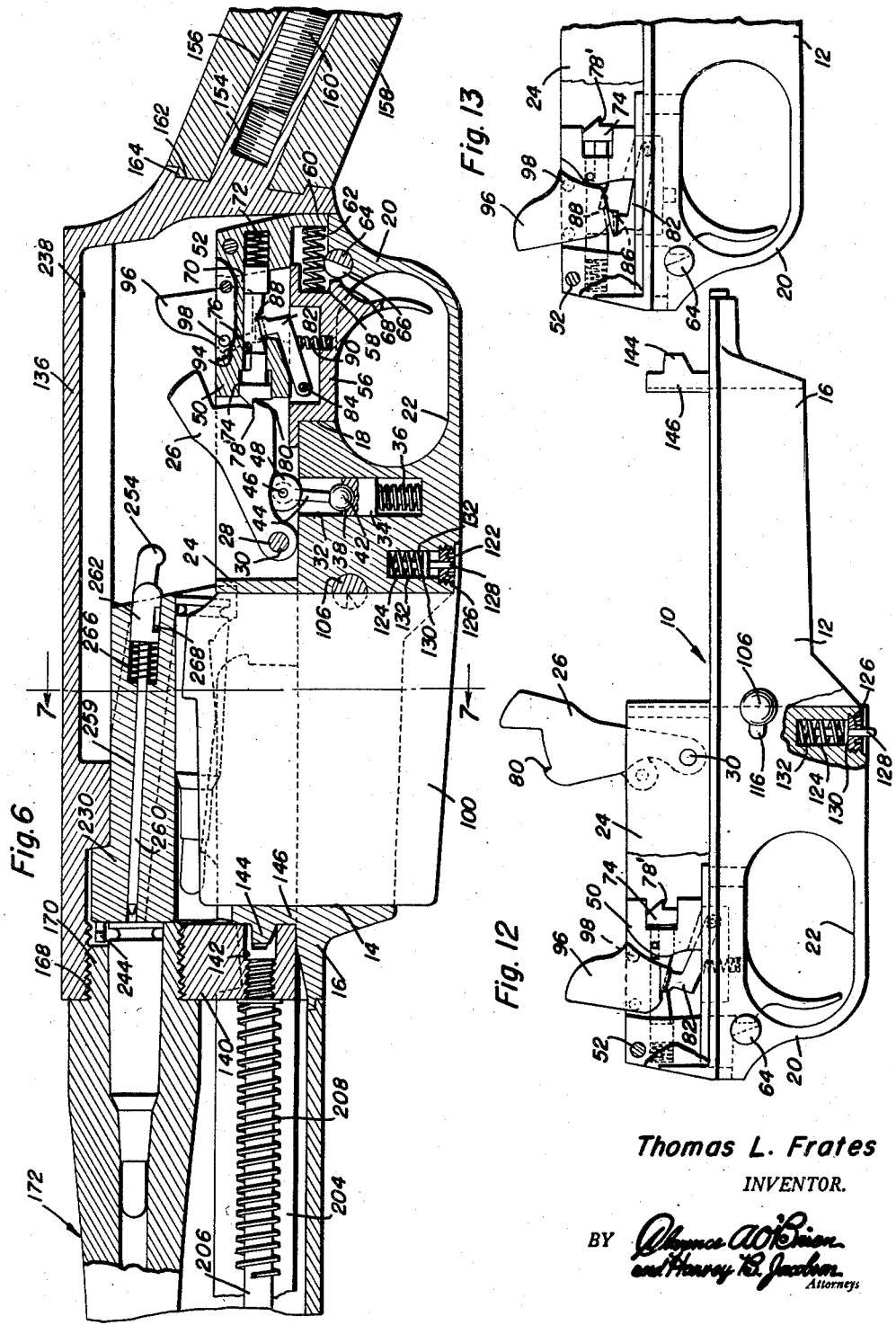

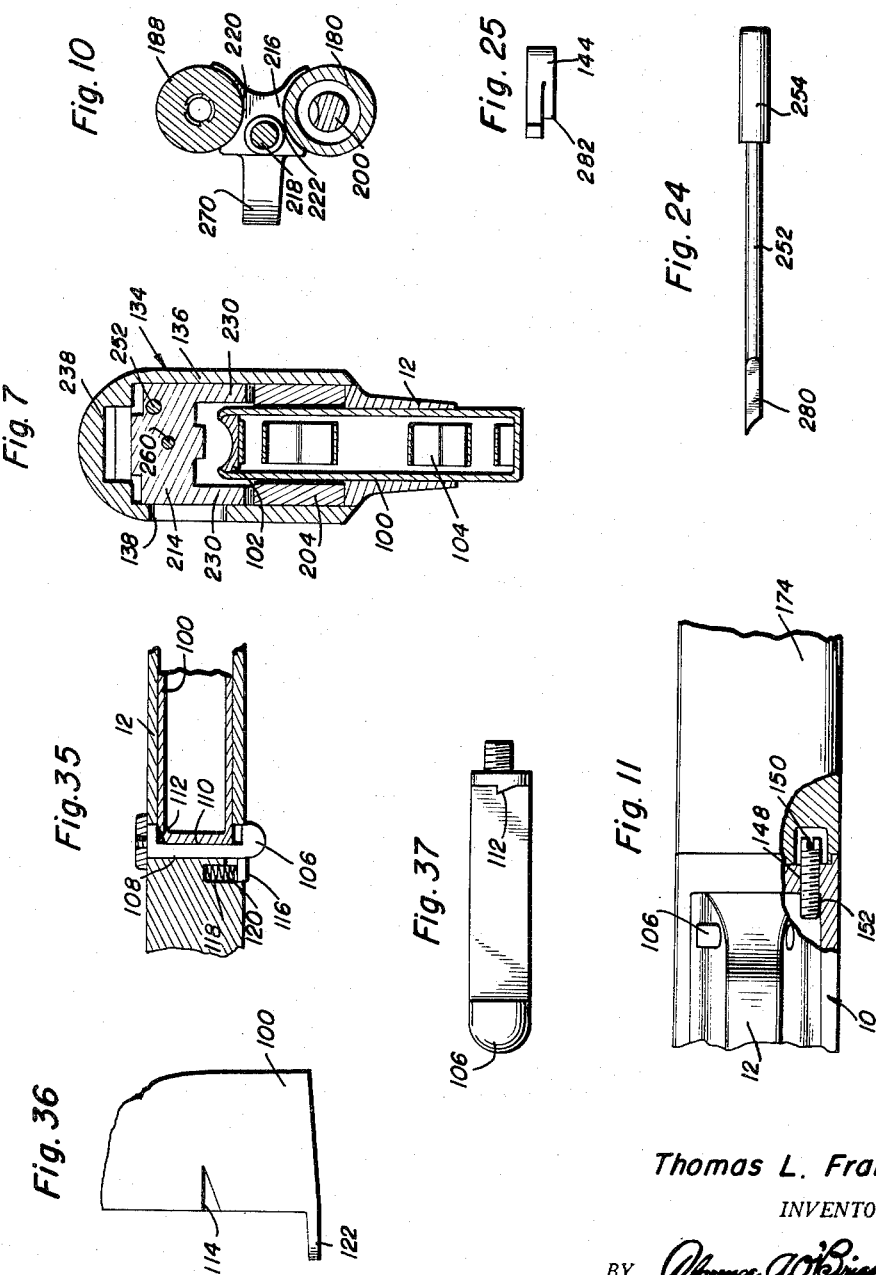

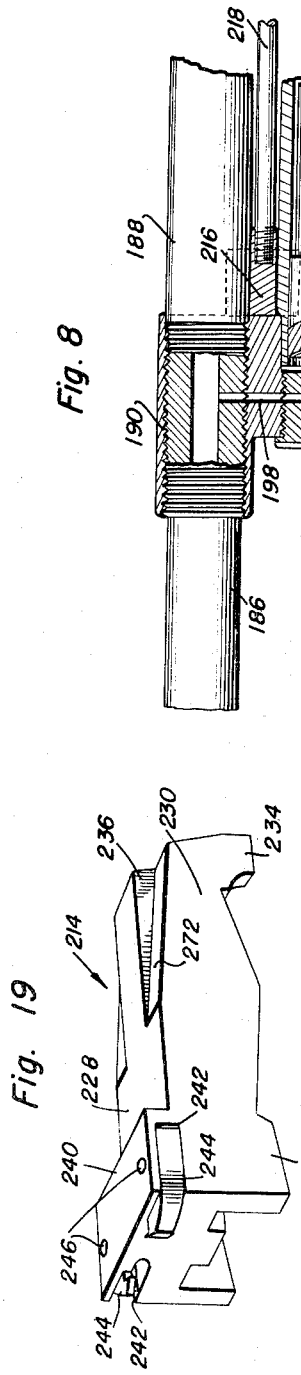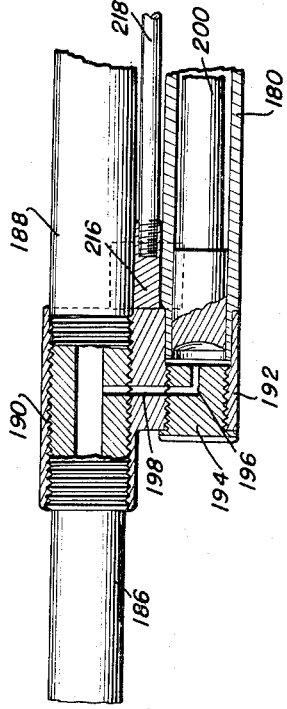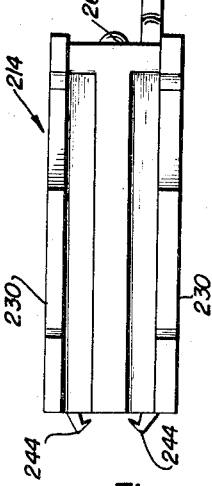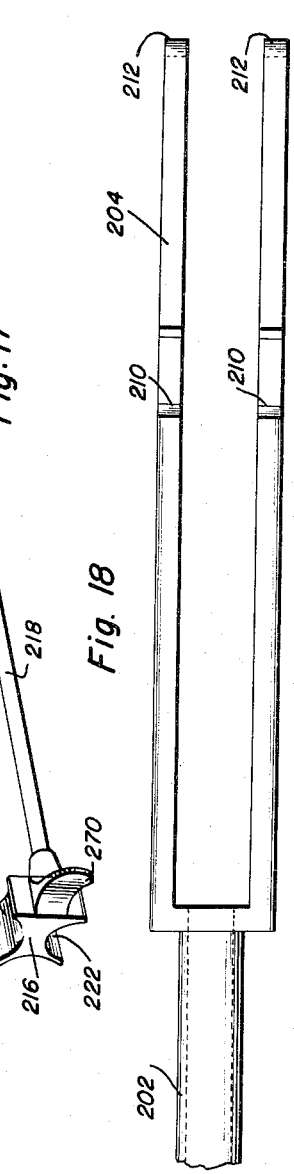
Thomas L. Frates
INVENTOR.

Sept. 3, 1957     T. L. FRATES     2,804,809
SEMI-AUTOMATIC RIFLE
Filed June 13, 1952     7 Sheets-Sheet 7
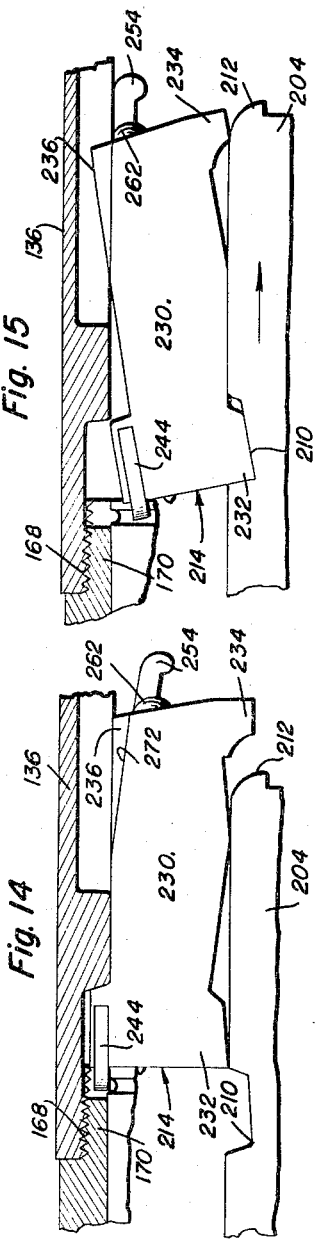
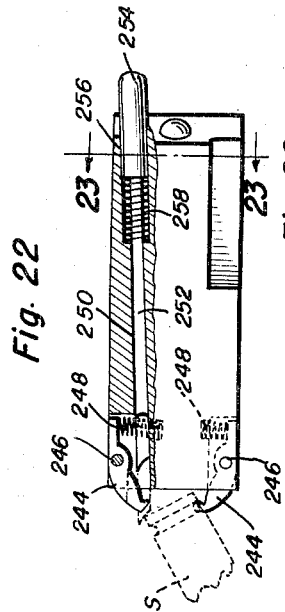
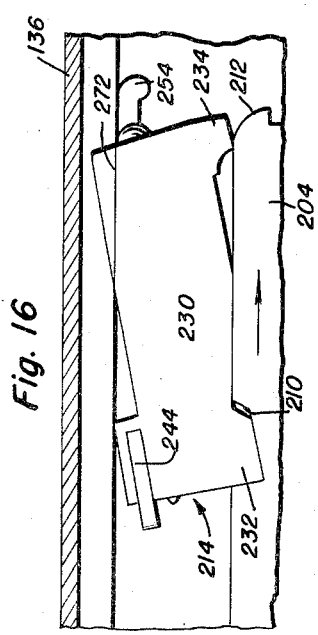
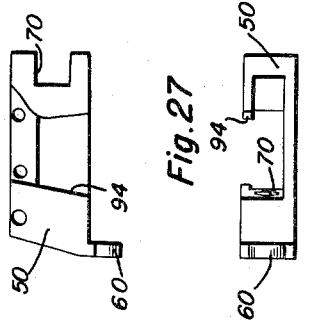
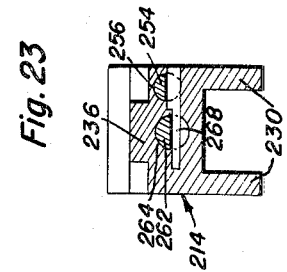
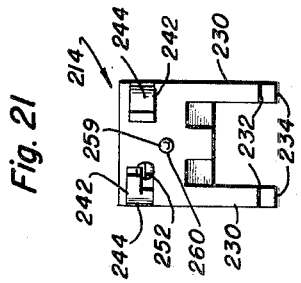
Thomas L. Frates
INVENTOR.

United States Patent Office 2,804,809
Patented Sept. 3, 1957

2,804,809

SEMI-AUTOMATIC RIFLE

Thomas L. Frates, Concord, Calif.

Application June 13, 1952, Serial No. 293,341

10 Claims. (Cl. 89—150)

This invention relates to new and useful improvements in firearms and the primary object of the present invention is to provide a semi-automatic rifle whose collective parts are inter-connected in a novel and improved manner, whereby the same may be readily assembled or disassembled in a minimum time.

Yet another object of the present invention is to provide a rifle having a novel and improved trigger and hammer group that will require releasing of the trigger from its firing position before it can be moved to actuate the hammer for firing of a second cartridge.

Another object of the present invention is to provide a semi-automatic rifle including a rocking and sliding breech bolt having a pair of coacting gripping jaws that will engage and hold the case of a fired shell as the bolt is moved rearwardly to a hammer cocking position, and which bolt is provided with means for ejecting the empty shell after the bolt has been moved rearwardly toward a discharge opening in the receiver of the rifle.

Another object of the present invention is to provide a semi-automatic rifle including a trigger and hammer group having a magazine holding pin and means for urging the magazine to a position for removal when the pin is moved to its release position.

Another object of the present invention is to provide a semi-automatic rifle having a manually actuatable bolt operating rod that is guidingly supported between the barrel of the rifle and the gas tube, to structurally improve the rifle while locating the rod in a non-obstructive position.

Another object of the present invention is the provision of a combined connector and guide between the barrel and the gas tube that also holds the hand gripping portion of the rifle and which further slidably receives and guides the bolt actuating rod.

Another object of the present invention is the provision of an improved fastening means for the trigger and hammer group, whereby the same may be quickly and readily attached to or removed from the receiver of the rifle in a convenient manner.

A further object of the present invention is to provide a semi-automatic rifle that is extremely simple and practical in construction, efficient and durable in operation, inexpensive to manufacture, service and maintain, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view of the present invention;

Figure 2 is an enlarged fragmentary longitudinal vertical sectional view of Figure 1 showing the cartridge being fired;

Figure 3 is a view similar to Figure 2 after the cartridge has been fired and the gas operated slide starting to move rearward;

Figure 4 is a view similar to Figures 2 and 3 with the slide bolt moved completely rearward to actuate the extractor and throw the empty cartridge from the receiver;

Figure 5 is a view similar to Figures 2, 3 and 4 with with the bolt moved forward and the trigger held rearward in order to feed a new cartridge to the barrel;

Figure 6 is a view similar to Figure 5 but with the trigger released to move forward;

Figure 7 is a vertical sectional view taken substantially on the plane of section line 7—7 of Figure 6;

Figure 8 is a fragmentary sectional view showing connector between gas chamber and rifle barrel;

Figure 9 is an enlarged detail sectional view taken substantially on the plane of section line 9—9 of Figure 1;

Figure 10 is an enlarged detail sectional view taken substantially on the plane of section line 10—10 of Figure 1;

Figure 11 is a fragmentary view with parts in section, showing the trigger and hammer group locked in the receiver by a retaining screw;

Figure 12 is an elevational view of trigger and hammer group removed from the receiver;

Figure 13 is a fragmentary view of Figure 12 and showing the sear latch mechanism actuated to permit forward movement of the sear with trigger held back;

Figure 14 is a fragmentary view of Figure 2 to show the relative position of the bolt and slide in the act of firing;

Figure 15 is a fragmentary view of Figure 3 to show the relative position of the bolt and slide upon continued rearward movement of the slide;

Figure 16 is a fragmentary view of the bolt and slide prior to the showing of these parts in Figure 4;

Figure 17 is a perspective view of the cocking rod;

Figure 18 is a fragmentary plan view of the slide;

Figure 19 is a prespective view of the sliding bolt;

Figure 20 is a bottom plan view of Figure 19;

Figure 21 is a front end view of Figure 19;

Figure 22 is a plan view of Figure 19 with parts in section;

Figure 23 is a sectional view taken substantially on the plane of section line 23—23 of Figure 22;

Figure 24 is a plan view of the ejector;

Figure 25 is a side view of one of the gripping jaws;

Figure 26 is a side view of the holding block for the sear;

Figure 27 is a bottom plan view of Figure 26;

Figure 28 is a side elevational view of the sear;

Figure 29 is a top view of Figure 28;

Figure 30 is a side elevational view of the sear releasing cam;

Figure 31 is a front view of Figure 30;

Figure 32 is a side elevational view of the trigger removed from trigger and hammer group;

Figure 33 is a top view of Figure 32;

Figure 34 is a front view of Figure 32;

Figure 35 is a sectional view taken substantially on the plane of section line 35—35 of Figure 1;

Figure 36 is a fragmentary side elevational view of the magazine clip; and,

Figure 37 is a side view of the clip release.

Trigger and hammer group

The trigger and hammer group 10 (Figure 12) comprises an elongated rigid member 12 having a clip receiving slot 14 in its forward end portion 16 and a trigger accommodating slot 18 in its rear end portion 20. The rear portion of the member is formed with a transverse finger-receiving opening 22 that extends under the slot 18.

The rear portion of member 12 is provided with an upstanding longitudinal channel 24 in which there is received a hammer 26 having an end aperture 28 that receives a transverse pin 30 extending through the front end of channel 24, whereby the hammer 26 may swing forwardly out of the channel 24 and rearwardly into the channel 24.

A vertical blind bore 32 extends downwardly from channel 24 into the portion 16 forwardly of opening 22 and slidably receives a plunger 34 whose lower reduced portion is embraced by a coil spring 36 that engages the lower end of the bore 32 to yieldingly urge the plunger upwardly. The upper end of plunger 34 is formed with a concave recess 38 that receives a spherical element 42 at the lower end of a short rocker arm 44. The upper end of arm 44 is pivoted, as at 46, to an ear 48 forming part of hammer 26.

A sear holding block 50 is removably secured within the rear end of channel 24 by a transverse pin 52 extending through the rear end of the channel 24 and the rear portion of the block. The block 50 rests upon the upper flat face of a trigger 56 which is received in the slot for longitudinal sliding movement. The upper flanged portion of trigger 56 rests upon the bottom wall of channel 24 for sliding movement thereon.

The rear end of trigger 56 is provided with a rearwardly facing recess 58 that opposes a lug 60 depending from the rear end of block 50 to enter slot 18. A coil spring 62 in the recess 58 is biased between the front wall of recess 58 and the lug 60 to yieldingly urge the trigger forwardly to a non-firing position.

A transverse safety pin 64 extends transversely through the rear end of member 12 under the spring 62 and includes a notch 66 for receiving a lug 68 on the trigger 56 when the pin 64 is moved axially in one direction. Movement of the pin 64 axially in the other direction will move notch 66 out of register with lug 68 so that the lug 68 will engage the periphery of pin 64 to block rearward movement of trigger 56 and thereby lock the trigger in a non-firing position.

Block 50 is provided with a longitudinal blind bore 70 whose rear end accommodates a coil spring 72 that urges a sliding latch element 74 in the bore 70 forwardly against a stop pin 76 extending transversely through the bore 70. A lip 78 at the forward end of latch element or sear 74 is adapted to engage a corresponding lip 80 on hammer 26 to retain the hammer in its lowered position.

Means is provided for locking the latch element or sear 74 against sliding movement. This means comprises a vertically swingable dog 82 pivoted on a transverse pin 84 extending through a recess in the upper wall of trigger 56. The free end of dog 82 is formed with a lip 86 for entering a notch 88 in the intermediate portion of latch element 74. A coil spring 90 in a depression in the lower wall of recess 92 engages and urges the dog 82 upwardly toward the latch element 74.

A vertical slot 94 in block 50 receives a vertically swingable cam 96 that is pivoted within slot 94 by a pin 98 extending through the block 50. The lower portion of cam 96 extends downwardly along side of latch element 74 and engages the portion of lip 78 that projects laterally from the latch element, whereas the upper portion of cam 96 extends upwardly from the slot 94.

An ammunition clip 100 is removably retained in slot 14 and includes a follower 102 that is urged by a spring 104 toward the upper open end of the clip. A transverse lock pin 106 extends through an aperture 108 in the rear wall of the slot 14 and its central portion is notched to provide a flat surface 110 flush with the rear wall of slot 14. A lug 112 on the surface 110 will enter a notch 114 in the clip 100 to lock the clip within its accommodating slot 14 (see Figures 35, 36, 37).

A laterally projecting lug 116 on the pin 106 faces a side recess 118 in member 12 in which there is positioned a coil spring 120 that urges the pin 106 to a position where lug 116 will enter notch 114 when the clip is inserted upwardly into slot 14. To release the clip 100, the pin 106 is pushed against action of spring 120 until lug 112 clears notch 114, whereupon the clip may be moved downwardly.

Means is provided for urging the clip 100 from its slot 14 when the pin 106 is pushed to its releasing position. This means comprises a rearwardly extending projection 122 on the lower rear corner of the clip that faces a blind bore 124 in the member 12 behind slot 14. A centrally apertured plug 126 is threaded in the lower end of bore 124 and slidably receives the stem 128 of a plunger 130 that is urged downwardly by a spring 132 in bore 124. The projection 122 will enter the lower part of bore 124 when the clip is within slot 14, and will engage and urge the stem 128 upwardly to compress the spring 132 so that when the pin is moved to its releasing position, spring 132 will urge plunger 130 against projection 122 thereby urging the clip partially from the slot 14.

*Receiver*

The receiver 134 comprises an elongated hollow and rigid metallic member 136 having a cartridge case discharge opening 138 (Figures 1 and 7) in one side wall and an open bottom for receiving the trigger and hammer group 10.

The forward wall 140 of the member 136 is provided with an aperture 142 for receiving the forwardly extending lug 144 of a rigid ear 146 rising from the forward end of the member 12. The rear wall of the member 136 is formed with a threaded aperture 148 that receivably engages a screw 150 which will extend into an aperture 152 in the rear end of member 12 to thereby releasably secure the trigger and hammer group 10 within the open bottom of the member 136 (see Figure 11).

The rear end wall of member 136 is formed with or fixedly secured to a rearwardly extending internally threaded tube 154 that extends into an axial bore 156 in a stock 158. A headed bolt 160 extends into the rear end of the bore 156 and is threaded into the tube 154 to force the reduced forward end 162 of stock 158 into a seat 164 in the rear end wall of member 136.

A rubber heel pad 166 is removably secured to the rear end of stock 158 and covers the head of the enlarged rear end of bore 156 in which the head of bolt 160 is received.

The upper portion of the front end wall of member 136 is provided with a threaded opening 168 that receivably engages the rear threaded end 170 of a barrel 172. The rear part of barrel 172 is received in a concave recess in the upper edge of a hollow hand grip 174 whose rear end engages the forward end of member 136. A guide and joiner member 176 is formed with an opening 178 accommodating the barrel 172 and rests against the forward end of the hand grip 174.

A longitudinal gas tube 180 underlies the barrel 172 and its rear portion extends through an opening 182 in member 176 to enter the hand grip 174. The rear part of tube 180 is provided with a flange 184 (see Figure 9) that is seated against the member 176 about opening 178.

Barrel 172 is composed of forward and rear tubular sections 186 and 188 that are connected together by a coupling 190. A sleeve 192 is fixed to and underlies the coupling 190 and receives the forward end of tube 180 therein. A plug 194 threaded in the forward end of sleeve 192 is formed with an angulated gas passage 196 that forms communication between tube 180 and a radial passage 198 in coupling 190, whereby gas from the barrel may pass into the front end of tube 180.

A plunger rod 200 is slidably received in tube 180 and its rear end engages the tubular shank 202 of a bifurcated member 204. The member 204 extends through hand grip 174 and into member 136 through slots in the front wall of member 136. A rod 206 is threaded at its rear end into the bore 142 and extends between and parallel to the furcation of member 204. A coil spring 208 about rod 206 is biased between member 204 and the shank of member 204 to yieldingly urge the member 204 forwardly.

The furcations of member 204 are provided with notches 210 in their upper edges and the rear ends of these furcations are provided with cam surfaces 212. The function of the notches 210 and the cam surfaces 212 will be described later in conjunction with a sliding bolt mechanism 214.

The enlarged removable forward end 216 of an actuating rod 218 is formed with upper and lower concave recesses 220 and 222 that accommodate the lower portion of barrel section 188 and the upper portion of tube 180 to permit guided sliding movement of rod between and parallel to the barrel 172 and tube 180. The rod 218 extends through an aperture 224 in member 176 and is provided with a lateral projection 226 at its rear end that engages member 204 whereby the member 204 may be manually forced rearwardly during initial loading of the rifle.

Sliding bolt mechanism

The sliding bolt mechanism 214 is provided for feeding cartridges, ejecting cartridge cases and cocking the hammer. This mechanism 214 comprises an elongated rigid member 228 illustrated best in Figure 19 having a pair of spaced parallel side walls 230 that are centrally notched at their lower edges to form forward and rear projections 232 and 234.

The upper rear corners of the member 228 are removed to form a longitudinal rib 236 that may enter a longitudinal groove 238 in the inner face of the upper wall of member 228. The upper forward raised part 240 of member 228 is provided with side slots 242 in which cartridge gripper jaws 244 are pivotally mounted by vertical pins 246. Springs 248 behind the jaws and in the slots 242 yieldingly urge the forward ends of the jaws toward each other.

Member 228 is formed with a longitudinal bore 250 that slidably receives an ejector rod 252 having an enlarged rear end 254 that is received in the enlarged rear part 256 of bore 250. A coil spring 258 about the rod 252 is biased between the end 254 and the forward wall of part 256 to yieldingly urge end 254 rearwardly from part 256. The forward end of rod 252 extends into one of the slots 242 and will engage the offset part 282 one of the jaws 244 (Figure 25) to force the same outwardly relative to a cartridge case when the rod 252 is moved forwardly relative to the member 228.

A second longitudinal bore 259 in member 228 slidably receives a firing pin 260 having an enlarged rear end 262 that enters the enlarged end 264 of bore 258. A spring 266 about pin 260, and biased between the end 262 and the front wall defining end 264, urges the pin 260 rearwardly relative to member 228. A transverse stop 268 extending through member 228 is disposed in a notch in ends 264 and 254 to limit sliding movement of the pin 260 relative to members 228 in both directions.

In practical use of the rifle thus described, the clip or magazine 100 filled with cartridges is first inserted upwardly into slot 14 until lug 112 enters the notch 114 to retain the clip in the slot 14.

A finger gripping lug 270 on the end 216 is then grasped and the rod 218 pulled rearwardly in order to pull the member 204 rearwardly. As member 204 moves rearwardly, the cam surfaces 212 ride against the projection 234 and force the forward end of breech bolt 214 downwardly with projections 232 entering recesses 210 so that the flat surfaces 272 of bolt 214 will ride against the upper wall of member 136 as the member 204 moves rearwardly.

When bolt 214 is moved rearwardly past the clip 100, the top cartridge in clip 100 will be urged upwardly into the path of the bolt 214 so that when gripping lug 270 is released, to permit spring 208 to move member 204 and bolt 214 forwardly, the forward end of the bolt will engage the top cartridge and urge the same into the rear end of the barrel 172.

As bolt 214 moves rearwardly it rides against the hammer 26 to lower the hammer and the hammer 26 cams past lip 78 until lip 80 engages under lip 78 to retain the hammer lowered.

Then the bolt 214 is moved forwardly, due to the action of spring 208 to force the top cartridge into the rear end of barrel 172 as the jaws 244 grip the base of the cartridge. The safety pin 64 is moved to its release position so that the trigger 56 may be pulled rearwardly to pull lip 78' out of engagement with lip 80 and plunger 34 swings the hammer 26 upwardly, whereupon hammer 26 engages end 262 to move the firing pin 260 forwardly to fire the cartridge.

Gas effected during firing of the first cartridge will pass from the barrel 172, through passages 198, 196 and into tube 180 to force rod 200 rearwardly and with it the slide member 204. The previous action will be repeated in that cam surfaces 212 will ride against projections 234 to rock the bolt and move its forward projection 232 into the recesses 210, whereupon the bolt will travel rearwardly with member 204.

During this second rearward movement of the bolt 214 three actions occur, namely; the hammer 26 is again lowered until its lip 80 locks under lip 78, cam 78 is lowered and end 254 of rod 252 engages the rear wall of receiver member 136. End 252 engages the rear wall of member 136 just before the bolt 214 moves to its full rear position so that forward movement of rod 252 relative to the bolt 214 will be permitted, and such movement will cause the cam surfaced end 280 to ride against a shoulder 282 on the jaw 244 it actuates to swing this jaw outwardly and then cam against the shell S (Figure 22) to force the shell through opening 138.

If the trigger is held back after the first cartridge is fired, the bolt 214 riding backwardly against cam 96 will lower the cam against lip 78 and force lip 78 out of notch 88 so that spring 72 may urge latch element 74 forwardly to where lip 78' may be engaged with lip 80. Through this construction, the trigger must be released and pulled rearwardly in order to fire a cartridge.

Having described the invention, what is claimed as new is:

1. In a semi-automatic rifle, a trigger and hammer group comprising an elongated rigid member having a slot in one end, a trigger slidably received in the slot, a spring urged hammer pivoted to the member, a block secured to the member over the trigger, a sliding sear carried by the block and engageable with the hammer to hold the latter in retracted position, means carried by the trigger engaging the sear to pull the sear rearwardly with the trigger, and means disposed in the path of a breech bolt to be actuated thereby and engageable with the sear engaging means for releasing the latter thus permitting the sear to move to a hammer engaging position.

2. In a semi-automatic rifle, a trigger and hammer group comprising an elongated rigid member having a slot in one end, a trigger slidably received in the slot, a spring urged hammer pivoted in the member, a block secured to the member over the trigger, a sliding sear carried by the block and engageable with the hammer to hold the latter in non-firing position, means carried by the trigger engaging the sear to pull the sear rearwardly with the trigger, and a pivoted member carried by the block and swingable in a plane with the hammer, said pivotal member being engageable with the sear engaging means to release the same.

3. In a semi-automatic rifle, a trigger and hammer group comprising an elongated rigid member having a slot in one end, a trigger slidably received in the slot, a spring urged forwardly and rearwardly swingable hammer pivoted to the member, a block secured to the member and having a longitudinal bore, a spring urged sear slidably received in said bore and engageable with the hammer to hold the same rearwardly, a spring urged dog pivoted to the trigger and having a laterally extending portion, said sear having a notch receiving said portion to lock the sear and trigger together whereby the same may be retracted as a unit, and means on the block for engaging said portion to release the dog from engagement with the sear.

4. In a semi-automatic rifle, a trigger and hammer group comprising an elongated rigid member having a slot in one end, a trigger slidably received in the slot, a spring urged forwardly and rearwardly swingable hammer pivoted to the member, a block secured to the member and having a longitudinal bore, a spring urged sear slidably received in said bore and engageable with the hammer to hold the same rearwardly, a spring urged dog pivoted to the trigger and having a laterally extending portion, said sear having a notch receiving said portion to lock the sear and trigger together whereby the same may be retracted as a unit, and a vertically swingable breech bolt actuatable member pivoted to the block and engageable with said portion to depress the dog out of engagement with said sear.

5. In a semi-automatic rifle, a trigger and hammer group comprising an elongated rigid member having a slot in one end, a trigger slidably received in the slot, a spring urged forwardly and rearwardly swingable hammer pivoted to the member, a block secured to the member and having a longitudinal bore, a spring urged sear slidably received in said bore and engageable with the hammer to hold the same rearwardly, a spring urged dog pivoted to the trigger and having a laterally extending portion, said sear having a notch receiving said portion to lock the sear and trigger together whereby the same may be retracted as a unit, and a cam member pivoted to said block for forward and rear swinging movement behind the hammer and engaging the laterally extending portion to depress the dog and force the portion out of the notch, whereby the sear may move forwardly to hammer engaging position.

6. In a semi-automatic rifle, a trigger and hammer group comprising an elongated rigid member having a slot in one end, a trigger slidably received in the slot, a spring urged forwardly and rearwardly swingable hammer pivoted to the member, a block secured to the member and having a longitudinal bore, a spring urged sear slidably received in said bore and engageable with the hammer to hold the same rearwardly, a spring urged dog pivoted to the trigger and having a laterally extending portion, said sear having a notch receiving said portion to lock the sear and trigger together whereby the same may be retracted as a unit, and a cam member pivoted to said block for forward and rear swinging movement behind the hammer and engaging the laterally extending portion to depress the dog and force the portion out of the notch, whereby the sear may move forwardly to hammer engaging position, said block having a side slot in which the cam member is disposed, said cam member extending transversely across and along side of said sear, and said laterally extending portion extending transversely across the block and into the said side slot under the cam member.

7. In a semi-automatic rifle including a receiver having an open bottom, a trigger and hammer group removably mounted in the open bottom, said group including a rigid member having a rear longitudinally extending slot, a trigger slidably received in said slot for forward and rear movement, a hammer pivoted to said member for forward and rear swinging movement, spring means engaging and urging the hammer forwardly, a block secured to the member over the trigger, a sear slidably carried by the block, means engaging and urging the sear forwardly into hammer engaging position, releasably coupling means between the trigger and the sear whereby the sear may be moved rearwardly from the hammer during rearward movement of the trigger, a forwardly and rearwardly swingable member pivoted to the block and engageable with the coupling means to release the latter, and a breech bolt slidably disposed in the receiver over the block for sequentially urging the hammer into engagement with the sear and engaging the swingable member to move the latter to coupling releasing position.

8. In a semi-automatic rifle including a receiver having an open bottom, a trigger and hammer group removably mounted in the open bottom, said group including a rigid member having a rear longitudinally extending slot, a trigger slidably received in said slot for forward and rear movement, a hammer pivoted to said member for forward and rear swinging movement, spring means engaging and urging the hammer forwardly, a block secured to the member over the trigger, and means slidably carried by the block engageable with the hammer to hold the latter rearwardly, means releasably coupling said trigger to the hammer engaging means to permit retraction of the latter by the trigger, a forwardly and rearwardly swingable member pivoted to the block for engaging and releasing the coupling means, and a breech bolt slidably received in the receiver and movable rearwardly past the hammer to force the hammer into engagement with the hammer engaging means and for engaging the swingable member to release the coupling means so that the hammer engaging means will be released even though the trigger is held rearwardly.

9. In a semi-automatic rifle including a receiver having an open bottom, a trigger and hammer group removably mounted in the open bottom, said group including a rigid member having a rear longitudinally extending slot, a trigger slidably received in said slot for forward and rear movement, a hammer pivoted to said member for forward and rear swinging movement, spring means engaging and urging the hammer forwardly, a block secured to the member over the trigger, and means slidably carried by the block engageable with the hammer to hold the latter rearwardly, means releasably coupling said trigger to the hammer engaging means to permit retraction of the latter by the trigger, a forwardly and rearwardly swingable member pivoted to the block for engaging and releasing the coupling means, and a breech bolt slidably received in the receiver and movable rearwardly past the hammer to force the hammer into engagement with the hammer engaging means and for engaging the swingable member to release the coupling means so that the hammer engaging means will be released even though the trigger is held rearwardly, means slidably received in said receiver and engageable with the bolt to move the latter rearwardly into engagement with said hammer and said swingable member.

10. In a semi-automatic rifle including a receiver having an open bottom, a trigger and hammer group removably mounted in the open bottom, said group including a rigid member having a rear longitudinally extending slot, a trigger slidably received in said slot for forward and rear movement, a hammer pivoted to said member for forward and rear swinging movement, spring means engaging and urging the hamer forwardly, a block secured to the member over the trigger, and means slidably carried by the block engageable with the hammer to hold the latter rearwardly, means releasably coupling said trigger to the hammer engaging means to permit retraction of the latter by the trigger, a forwardly and rearwardly swingable member pivoted to the block for engaging and releasing the coupling means, and a breech bolt slidably received in the receiver and movable rearwardly past the hammer to force the hammer into engagement with the hammer engaging means and for engaging the swingable member to release the coupling means so that the hammer engaging means will be released even through the trigger is held rearwardly, means slidably received in said receiver and engageable with the bolt to move the latter rearwardly into engagement with said hammer and said swingable member, said last named means being gas operated.

References Cited in the file of this patent

UNITED STATES PATENTS

| | | |
|---|---|---|
| 398,595 | Emmens | Feb. 26, 1889 |
| 933,254 | Knous | Sept. 7, 1909 |
| 1,344,991 | Cunningham | June 29, 1920 |
| 1,359,609 | Lang | Nov. 23, 1920 |
| 1,453,439 | Edillo | May 1, 1923 |
| 2,126,076 | Wright | Aug. 9, 1938 |
| 2,549,797 | Gaidos | Apr. 24, 1951 |

FOREIGN PATENTS

| | | |
|---|---|---|
| 205,998 | Great Britain | Nov. 1, 1923 |
| 554,834 | Germany | July 14, 1932 |